United States Patent [19]

Glassmeyer

[11] 4,165,086
[45] Aug. 21, 1979

[54] CLEANABLE DRAIN FOR TANKER VEHICLE

[75] Inventor: John J. Glassmeyer, Glenwood, Ill.

[73] Assignee: Pullman Incorporated, Chicago, Ill.

[21] Appl. No.: 898,755

[22] Filed: Apr. 21, 1978

[51] Int. Cl.² .................................................. B60P 3/22
[52] U.S. Cl. ................................ 280/5 R; 105/358; 137/351
[58] Field of Search ............ 280/5 R, 5 G, 5 C, 5 D, 280/5 E; 105/358, 360; 239/651, 589; 137/577, 344, 351; 220/71, 85 P

[56] References Cited

U.S. PATENT DOCUMENTS

| 3,776,414 | 12/1973 | Baker | 220/71 |
|---|---|---|---|
| 3,883,148 | 5/1975 | Miller | 280/5 C |

Primary Examiner—John A. Pekar
Attorney, Agent, or Firm—Richard J. Myers

[57] ABSTRACT

A cleanable drainage arrangement for fluent products overflowing from the dam or reservoir of a tanker vehicle including a chute or outwardly opening trough having a removable translucent cover plate to accommodate periodic inspection and cleaning during field use.

16 Claims, 4 Drawing Figures

000
CLEANABLE DRAIN FOR TANKER VEHICLE

BACKGROUND OF THE INVENTION

1. Field of the Invention

The present invention pertains to tanker vehicles and in particular to drainage arrangements for said vehicles.

2. Description of the Prior Art

In certain tanker vehicles a dam or reservoir is provided about the periphery of the tank filling port to prevent overflow or run-off of fluent products and thus the accumulation of a greasy or dirt collecting scum on the skin of the tanker. Product accumulations in the dam are in turn drained from the dam through pipes or tubing. However, field experience has shown that since pipes and tubing cannot readily be cleaned, they are usually cut off and discarded when they become clogged, thus obviating the function of the dam.

SUMMARY OF THE INVENTION

The present invention provides for an improved drainage arrangement for fluent products overflowing from the dam or reservoir of a tanker vehicle. More particularly, a chute or outwardly opening trough having a removable cover plate to accommodate periodic cleaning is secured to the outer skin of the tanker on either side of the vehicle to provide drainage channels from the dam to the ground, thus providing a construction which may be easily cleaned and maintained to assure adequate drainage of fluent materials from the dam.

DESCRIPTION OF THE PREFERRED EMBODIMENT

Figure 1:
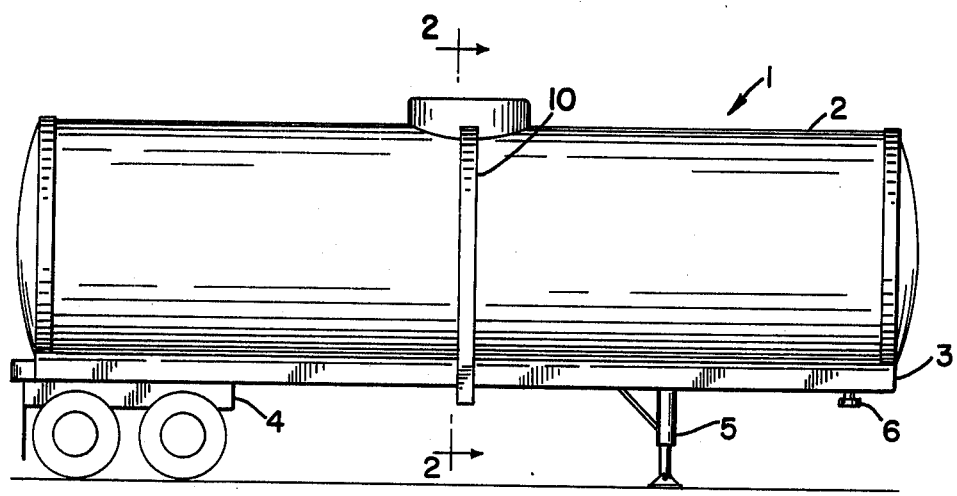
FIG. 1 is a side elevational view of highway tanker trailer embodying the present invention.

As shown in the drawings, the present invention is adapted for use on a highway tanker trailer or related tanker vehicle used to transport hot asphalt or similar fluent materials. The tanker trailer 1 includes an elongated tank 2 carried on a longitudinally extending central cradling beam assembly or underframe 3 supported on a conventional trailer bogey 4 and landing gear 5 or fifth wheel (not shown) through kingpin 6 in a conventional manner. The tank construction includes an opening or filling port 8 having a peripheral dam or reservoir 9 at the top of the tank for filling it with hot asphalt or other related fluent product.

Figure 2:
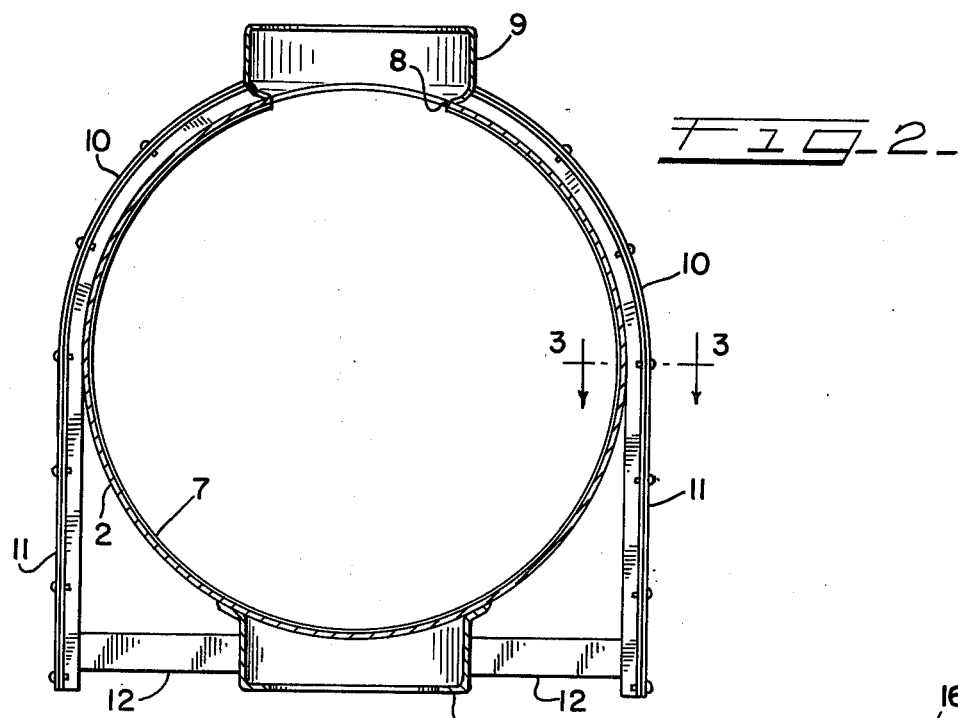
FIG. 2 is a cross-sectional view taken along line 2—2 in FIG. 1.
Figure 3:
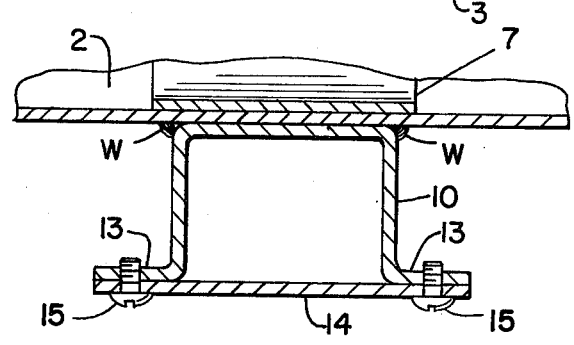
FIG. 3 is a cross-sectional view of the drainage channel of the present invention taken along line 3—3 in FIG. 2.
Figure 4:
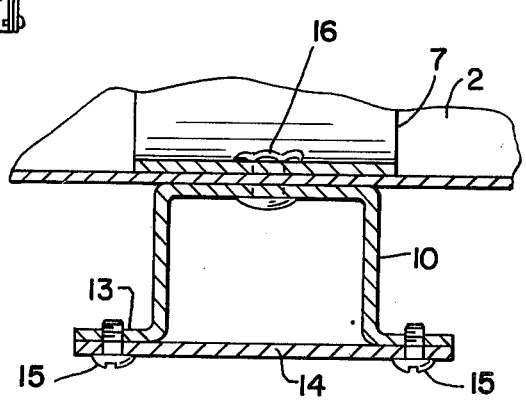
FIG. 4 is a cross-sectional view similar to FIG. 3 showing an alternative embodiment of the invention.

To accommodate drainage from the dam and as best shown in FIG. 2, the invention provides for a pair of vertical arcuate drainage channels 10 substantially encircling the upper portion of the tank 2 and having depending lower end portions 11 rigidly supported from the central beam assembly 3 by horizontal channel supporting brackets 12 cantilevered therefrom. The channels 10 are generally longitudinally aligned with one of the ribs or internal reinforcing members 7 of the tank 2 and are welded to the skin of the tank as indicated at "w", or alternatively by rivets 16 as illustrated in the alternative embodiment shown in FIG. 4. The channels 10 are of an outwardly opening hat shaped cross-sectional configuration including outer flange portions 13 to which a cover plate 14 is removably secured by screws or snap type fasteners 15. The cover plates may be of one or more sections and of metal or alternatively of a translucent plastic material so that clogged sections of the drainage channels may be easily located by visual inspection by a vehicle operator. Additionally, a Teflon or epoxy coating is provided on the interior surfaces of the drainage channels 10, and the cover plate to abate corrosion or deterioration thereof.

From the above it can be seen that each drainage channel may be cleaned by removing its associated cover plate and swabbing or scraping out obstructive accumulations of dirt and product (e.g., hardened asphalt) whereafter the plate may be replaced and the vehicle returned to service.

Having disclosed the preferred embodiment of the invention it will be understood by those skilled in the art that various other forms of the invention will come within the scope of the appended claims.

What is claimed is:

1. For a highway vehicle having a generally cylindrical tank assembly having a skin and including longitudinally spaced reinforcing members and a filling port arrangement in the upper proximity of the tank skin having a reservoir about the periphery thereof to prevent run-off of fluent product onto the other surface of the tank skin, an improved reservoir drainage arrangement, comprising:

a drain tube having an upper end portion carried on the outer surface of the tank and opening into the reservoir and a lower end portion depending therefrom and extending beyond the lower proximity of the tank skin, said tube being longitudinally aligned with one of said reinforcing members and having an inner channel portion and an outer removable cover plate means coextensive therewith, said inner channel including an outwardly opening inner trough section and outer brim flange portions extending therefrom, and attachment means removably securing said plate means to the brim flange portions of the inner channel to form said drain tube and accommodate cleaning thereof.

2. The invention according to claim 1, and said cover plate means being a plurality of selectively removable plates.

3. The invention according to claim 1, and said cover plate means being of a translucent material.

4. The invention according to claim 1, and said inner trough section being welded to said tank.

5. The invention according to claim 1, and mechanical fastening means coupling said inner trough section, skin and reinforcing member.

6. The invention according to claim 1, and said attachment means being a plurality of snap-type mechanical fasteners.

7. The invention according to claim 1, and said reinforcing member being internally positioned within the tank.

8. The invention according to claim 1, and the interior surface of said drain tube having a corrosion resistant thermoplastic coating thereon.

9. The invention according to claim 1, and said lower end portion of the tube being in a vertical plane at the lateral extremity of the tank.

10. The invention according to claim 9, and
bracket means cantilevered from the lower proximity of the tank assembly supporting the lower end portion in said plane.

11. For a highway vehicle having a generally cylindrical tank assembly having a skin and including a filling port arrangement in the upper proximity of the tank skin having a reservoir about the periphery thereof to prevent run-off of fluent product onto the outer surface of the tank skin, an improved reservoir drainage arrangement, comprising:
a drain tube having an upper end portion carried on the outer surface of the tank and opening into the reservoir and a lower end portion depending therefrom and extending beyond the lower proximity of the tank skin,
said tube having an inner channel portion and an outer removable cover plate means co-extensive therewith.

12. The invention in accordance with claim 11, and
attachment means removably securing said cover plate means to said inner channel to form said drain tube and to accommodate cleaning thereof.

13. The invention in accordance with claim 11, and
said cover plate means being a plurality of selectively removable plates.

14. The invention in accordance with claim 11, and
said inner channel portion being welded to said tank assembly.

15. The invention in accordance with claim 11, and
mechanical fastening means coupling said inner channel portion to said tank assembly.

16. The invention in accordance with claim 11, and
the interior surface of said drain tube having a corrosion resistant non-metallic coating thereon.

* * * * *